(12) United States Patent
Utsumi

(10) Patent No.: US 6,661,150 B2
(45) Date of Patent: Dec. 9, 2003

(54) MOTOR HAVING STATOR WITH L-SHAPED SALIENT POLES

(75) Inventor: Shinichi Utsumi, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 10/154,336

(22) Filed: May 22, 2002

(65) Prior Publication Data

US 2002/0195888 A1 Dec. 26, 2002

(30) Foreign Application Priority Data

May 24, 2001 (JP) ....................... 2001-155214

(51) Int. Cl.[7] ..................... H02K 21/00; H02K 1/24; H02K 21/24
(52) U.S. Cl. .................. 310/254; 310/216; 310/218; 310/67 R
(58) Field of Search .................. 310/216, 217, 310/218, 254, 67 R; 360/98.07, 99.04, 99.08

(56) References Cited

U.S. PATENT DOCUMENTS

| 4,902,941 A | * | 2/1990 | Merkle et al. | ............... 310/216 |
| 4,949,000 A | * | 8/1990 | Petersen | ..................... 310/179 |
| 5,500,780 A | * | 3/1996 | Boutaghou et al. | ...... 360/99.08 |
| 5,604,389 A | * | 2/1997 | Nitta et al. | ............... 310/67 R |
| 5,670,837 A | * | 9/1997 | Boutaghou et al. | .......... 310/184 |
| 6,013,965 A | * | 1/2000 | Suzuki et al. | ............... 310/186 |
| 6,104,114 A | * | 8/2000 | Takeda et al. | ................. 310/90 |

FOREIGN PATENT DOCUMENTS

| GB | 2158654 | * | 11/1985 | ................ 310/254 |
| JP | 03-003642 | | 1/1991 | |
| JP | 06-296353 | | 10/1994 | |

* cited by examiner

*Primary Examiner*—Tran Nguyen
(74) *Attorney, Agent, or Firm*—Reed Smith LLP

(57) ABSTRACT

A motor comprises a base to rotatably support a rotor and a ring-shaped magnet having a magnetic pole segment which is S-pole shaped and a magnetic pole segment which is N-pole and which are magnetized alternately in the circumferential direction. The ring-shaped magnet is fixed on the rotor. An armature core with a plurality of pole teeth is radially formed and a coil is wound up in each of the pole teeth. The armature core is mounted on the base so as to face an internal circumference of the ring-shaped magnet. First salient poles of the armature are included, the tip of the first salient pole faces the ring-shaped magnet through an opening in the circumferential direction. Second salient poles of the armature core extend in the circumferential direction from the tip of the second salient poles which face the ring-shaped magnet through an opening in the axial direction.

3 Claims, 2 Drawing Sheets

MOTOR HAVING STATOR WITH L-SHAPED SALIENT POLES

CROSS-REFERENCE TO RELATED APPLICATIONS

This application claims priority of Japanese No. 2001-155214, filed May 24, 2001, the complete disclosure of which is hereby incorporated by reference.

BACKGROUND OF THE INVENTION a) Field of the Invention

The present invention relates to a thin outer rotor type brushless motor for use in a device to rotatably drive flexible discs, CD's and the like and, more particularly, relates to a configuration of an armature core of the brushless motor.

b) Description of the Related Art

An outline of an armature core and a magnet portion of conventional motor 100 is shown in FIG. 6 with a cross section of one-half from the center.

In armature core 101, a plurality of pole teeth 102 are formed radially and a coil 103 is wound up in each of pole teeth 102.

Armature core 101 is mounted on the base 104 through a spacer 105 so as not to touch the base 104 directly.

A ring-shaped magnet 106 is concentric with the armature core 101 and is fixed on the outer circumference of disc 108 which can rotate with a rotating shaft 107 in the center which is supported on the base 104.

The clearance between an internal circumferential surface 106*a* and an outer circumferential surface 109*a* of salient poles 109 which are the tip of pole teeth 102 has a constant opening (air gap).

c) Problems to be Solved by the Invention

However, as miniaturization of a computer progresses, a small size of a disc drive device is expected and a motor for use in the above device is required to form a thin motor shape.

On the other hand, if the armature core 101 is made thin, magnetic flux H passing through the salient poles 109 of the armature core 101 decreases. Thus, the torque of a motor is reduced.

Additionally, if a wire size of coil 103 is made small in order to make the coil 103 thin, electric resistance increases so that current decreases and the torque of a motor is also reduced.

Furthermore, because a magnetic flux depends upon the number of turns of coil 103, a method for reducing the number of turns and the thickness also reduces the torque of the motor.

On the other hand, even if the magnetic force of the magnet is strengthened in order to reinforce the torque, the cross section of the armature core 101 is small so that magnetic flux passing therethrough causes saturation. Thus, enhancement of the magnetic force does not result.

OBJECT AND SUMMARY OF THE INVENTION

Therefore, a primary object of the present invention is to offer a motor that has thinness and can provide a large torque.

In order to achieve the above object, a motor according to the present invention, fundamentally, a base to support rotatably with a rotor, a ring-shaped magnet having a magnetic pole segment which is S-pole shaped and a magnetic pole segment which is N-pole shaped are magnetized alternately in the circumferential direction, the ring-shaped magnet is fixed on the rotor, an armature core in which a plurality of pole teeth are formed radially and a coil is wound up in each of the pole teeth and the armature core which is mounted on the base to face an internal circumference of the ring-shaped magnet.

In the motor, first salient poles of the armature core, the tip of the first salient poles faces the ring-shaped magnet through an opening in the circumferential direction, second salient poles of the armature core, which extend in the circumferential direction from the tip of the second salient poles, which face the ring-shaped magnet through an opening in the axial direction.

In the ring-shaped magnet, the magnetic pole segment facing the first salient poles and the magnetic pole segment facing the second salient poles are magnetized by the same pole.

Furthermore, notching parts are formed on the base, into which notching parts of the armature core fits notching parts and the second salient poles of said armature core are fastened on the internal circumferential surface of the notching parts.

As described above, the motor according to the present invention can be thin and the area of the salient poles of the armature core facing the ring-shaped magnet can be made broadly so that the magnetic force of the ring-shaped magnet is stronger than that of the conventional motor.

Thus, the magnetic flux increases and can strengthen the motor torque.

DESCRIPTION OF THE PREFERRED EMBODIMENTS

Figures 1, 2, 3:
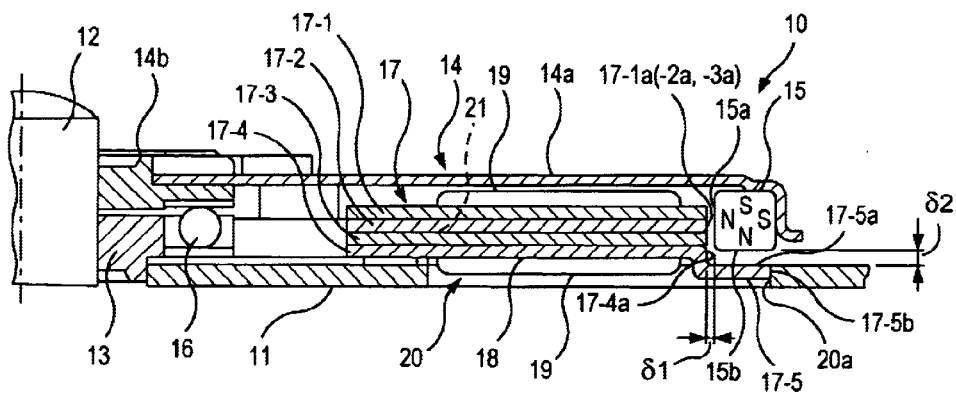
FIG. 1 is a schematic side view with a half cross section showing the first embodiment which the present invention is applied to a motor.
FIG. 2 is a perspective view showing an outline of armature core portion of the first embodiment which the present invention is applied to a motor.
FIG. 3 is a perspective view showing a magnetizing aspect of a ring-shaped magnet in which the present invention is applied to a motor.

The motor according to the present invention is described hereinafter, referring to the drawings.

FIG. 1 shows the outline of the structure of the first embodiment of a motor according to the present invention and the half-cross section from the center.

In FIG. 1, reference number 10 is a motor, reference number 11 is a base and a bearing 13 which support a center shaft 12 is fixed to base 11.

Rotor 14 which is supported by the center shaft 12 is formed of an outer circumferential portion 14*a* of rotor yoke and a center portion 14*b*.

The outer circumferential portion 14a of the rotor yoke is formed by magnetic material and a ring-shaped magnet 15 is fixed on an outer circumferential edge. The outer circumferential portion 14a forms a part of magnetic circuit.

The center portion 14b is formed by the resin. The rotor including the ring-shaped magnet 15 is rotatably supported by a ball bearing 16.

As shown in FIG. 2 with a perspective view, a plurality of pole teeth 18 are formed radially in an armature core 17 and a coil 19 is wound up in the pole teeth 18, respectively.

Notching portions 20 are formed radially corresponding to the position (configuration) of radial pole teeth 18 and the shape in base 11.

The coils 19 are (inserted) fitted loosely in notching portions 20 and the armature core 17 is fixed by (little) screws 21 on the base 11.

The armature core 17 is lamination structure of magnetic steel sheets such as a silicon steel plate etc. (four sheets in this embodiment).

In the figure, outer circumferential surfaces 17-1a to 17-3a of steel plates 17-1 to 17-3 which are mounted on the upper of the base 11 faces to an internal circumference surface 15a of the ring-shaped magnet 15 through an opening (air gap) These function as the first salient pole of armature core 17.

In the figure, a steel plate 17-4, which is the lowest layer on the base 11, has a bending portion 17-4a. The bending portion 17-4a is shaped like a cross section crank at the top position of the outer circumferential surfaces 17-1a to 17-3a of steel plates and a extension portion 17-5.

The upper surface 17-5a of the extension portion 17-5 faces under surface 15b of the ring-shaped magnet 15 through an opening (air gap) and the extension portion 17-5 functions as the second salient pole of armature core 17.

The outer circumferential surface 17-5b of the extension portion 17-5 fits in the inside 20a of notching portions 20 which are formed on base 11 and fastened by welding or adhesion in base 11.

Magnetic pole segments 15s, 15n, which are differently shaped poles, S-pole or N-pole, are magnetized alternately in the ring-shaped magnet 15.

An internal circumference surface 15a and under surface 15b which belong to each (the same) segment 15s/15n are magnetized by the same pole (an N-pole is shown in the cross section of FIG. 1).

A perspective view of FIG. 3 shows a magnetizing aspect from the under surface side.

Figure 4:
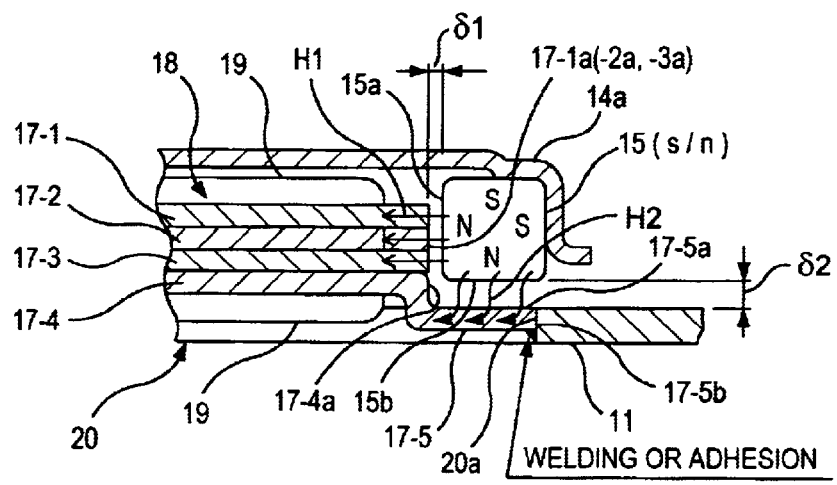
FIG. 4 is a explanatory drawing of a magnetic path formed with the first embodiment which the present invention is applied to a motor.

Therefore, as shown in a partial expanding view of FIG. 4, a magnetic circuit H1 multiplies a magnetic flux of a magnetic circuit H2. Thus, the total magnetic flux of the magnetic circuit H1 increases.

Furthermore, the motor has (adds to) the steel plate 17-4 of the armature core so that a cross-sectional area of the armature which a magnetic flux does interlinkage(pass through) increases.

Accordingly, it is avoided that a magnetic flux incrementation of the magnet does not show enough effect by a magnetic saturation.

Figure 5:
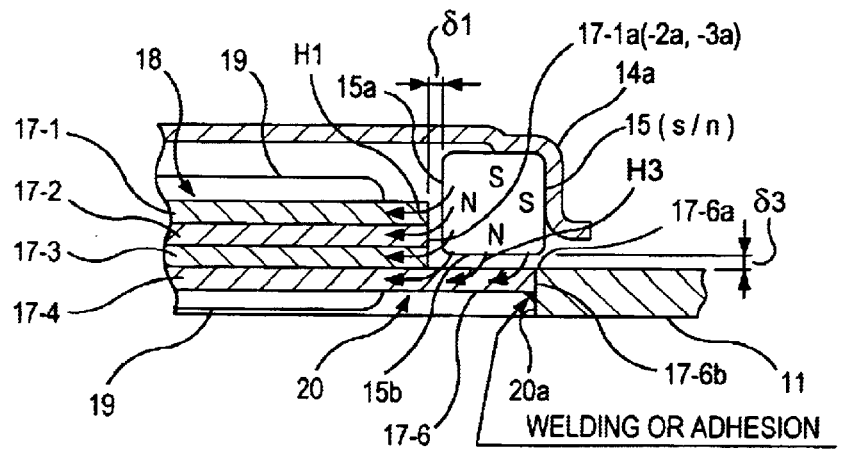
FIG. 5 is a side view with a partial cross section showing the second embodiment of the motor according to the present invention.
Figure 6:
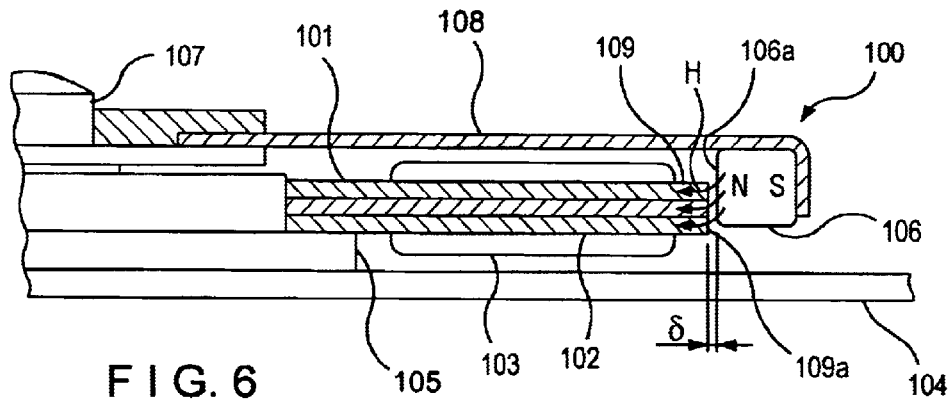
FIG. 6 is a side view with cross section typically showing a conventional spindle motor.

Next, the second embodiment of the present invention is described based on FIG. 5.

In the second embodiment shown in FIG. 5, a steel plate 17-4 of the lowest (under) layer of armature core 17 doesn't have a bending portion 17-4a and extends flat.

The steel plate 17-4 functions as a second salient pole 17-6.

The top surface 17-6a of the second salient pole 17-6 faces the under surface 15b of magnet 15 through an opening (air gap) and comprises magnetic circuit H3.

The outer circumferential surface 17-6b of the second salient pole 17-6, the same as the first embodiment, fits in the inside 20a of notching portions 20 which is formed on base 11 and fastens by welding or adhesion in base 11.

Also, the same as the first embodiment, magnetic pole segments 15s, 15n, which are differently shaped poles, S-pole or N-pole, are magnetized alternately in the ring-shaped magnet 15.

Magnetic circuit H3 is also essentially similar.

Therefore, in the second embodiment, a flex process of the second salient pole 17-6 is omitted. As a result, the second embodiment can be easy to manufacture.

Note that description is omitted which is similar to that of the first embodiment.

As set forth in the above-mentioned description, a motor according to the present invention, an armature core provides first salient poles and second salient poles which face two surfaces, that is an internal circumference surface and the under surface of a ring-shaped magnet of a rotor so that magnetic flux occurring from the two (ends) surfaces of the ring-shaped magnet is picked up without waste and the motor torque can be improved.

Furthermore, notching portions are formed in a base and the armature core, including coil, fits (inserts) into the notching portions so that the measurement in the thickness direction is reduced.

As a result, the construction of the motor can increase one piece of lamination steel plates comprising the armature core (as compared to a conventional motor).

It can make room (space) for a magnetic path of the armature core so that the conditions of magnetic saturation are eased.

Accordingly, the motor can employ a more powerful magnet and an increase of the motor torque can be effected.

While the foregoing description and drawings represent the present invention, it will be obvious to those skilled in the art that various changes may be made therein without departing from the true spirit and scope of the present invention.

What is claimed is:

1. A motor comprising:
    a base to rotatably support a rotor;
    a ring-shaped magnet having a plurality of magnetic pole segments, wherein said pole segments including a number of south (S) magnetic pole segments and a number of north (N) magnetic pole segments, said S and N magnetic pole segments are magnetized alternately in the circumferential direction, said ring-shaped magnet being fixed on said rotor;
    an armature core with a plurality of pole teeth being radially extended outward and a coil being wound up in each of said pole teeth, said armature core being mounted on said base so as to face an internal circumference of said ring-shaped magnet;
    said armature each of said pole teeth of core having first salient poles, a tip of said first salient pole vertically facing said ring-shaped magnet through an opening in the circumferential direction; and said armature core having second salient poles, said second salient poles extending in the circumferential direction from the tip of said first salient poles, and horizontally facing said ring-shaped magnet through an opening in the axial direction.

2. A motor according to claim 1 wherein, in said ring-shaped magnet, said magnetic pole segment facing said first salient poles and said magnetic pole segment facing said second salient poles are magnetized by the same pole.

3. A motor according to claim 1 wherein notching portions are formed on said base, wherein said armature core fits in said notching parts and said second salient poles of said armature core are fastened on an internal circumferential surface of said notching portions.

* * * * *